United States Patent [19]

Hasegawa

[11] Patent Number: 5,339,523
[45] Date of Patent: Aug. 23, 1994

[54] METHOD OF MACHINING SLEEVE BEARING

[75] Inventor: Saburo Hasegawa, Hanamaki, Japan

[73] Assignee: Matsushita Electric Industrial Co., Ltd., Osaka, Japan

[21] Appl. No.: 128,750

[22] Filed: Sep. 30, 1993

Related U.S. Application Data

[63] Continuation of Ser. No. 884,929, May 18, 1992, abandoned.

[30] Foreign Application Priority Data

May 24, 1991 [JP] Japan .................. 3-120041

[51] Int. Cl.⁵ .................. B21D 17/00; B21D 53/10
[52] U.S. Cl. .................. 29/898.02; 29/90.01; 29/898.056; 72/75; 72/370
[58] Field of Search .............. 29/89.5, 90.01, 898.02, 29/898.042, 898.056, 898.059; 72/75, 78, 100, 101, 215, 370

[56] References Cited

U.S. PATENT DOCUMENTS

| | | | |
|---|---|---|---|
| 3,130,477 | 4/1964 | Gill | 29/90.01 |
| 3,559,258 | 2/1971 | Gardner | 29/90.01 |
| 4,542,565 | 9/1985 | Berstein et al. | 29/90.01 |

FOREIGN PATENT DOCUMENTS

63-311620 12/1988 Japan .

Primary Examiner—Timothy V. Eley
Assistant Examiner—S. Thomas Hughes
Attorney, Agent, or Firm—Stevens, Davis, Miller & Mosher

[57] ABSTRACT

A short cylindrical and thin sleeve bearing including a radial bearing portion of a dynamic pressure type on which grooves are formed is worked with high accuracy. Grooves are formed on an inner peripheral surface of a blank by a groove forming tool. Raised deformations generated on the inner peripheral surface as a result of this groove forming are removed by ball sizing of passing a steel ball on the inner peripheral surface. Further, by a roller burnishing tool, the cylindrical bore of the bearing is finished to have a predetermined diameter, and simultaneously, specular finish of the inner peripheral surface is effected.

6 Claims, 7 Drawing Sheets

PRIOR ART

METHOD OF MACHINING SLEEVE BEARING

This application is a continuation of application Ser. No. 07/884,929, filed May 18, 1992 (abandoned).

BACKGROUND OF THE INVENTION

The present invention relates to a method of machining a sleeve bearing which comprises a radial bearing portion of a dynamic pressure type with grooves (dynamic pressure grooves) formed on an inner peripheral surface thereof and, more particularly, to a method of machining a sleeve bearing of high accuracy used for a rotary section in a VTR or FDD (floppy disk drive).

Figure 1A:
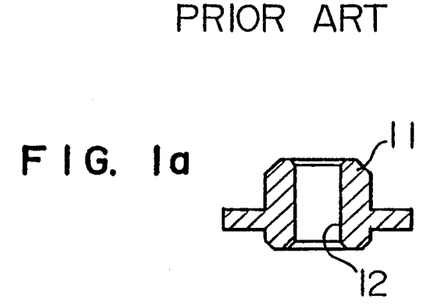
FIG. 1a, 1b, 1c, are views for explaining conventional steps of machining a sleeve bearing.
Figure 1B:
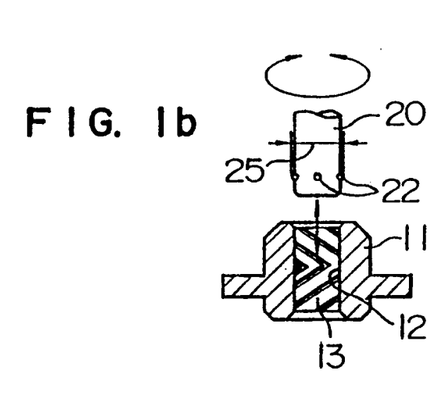
Figure 1C:
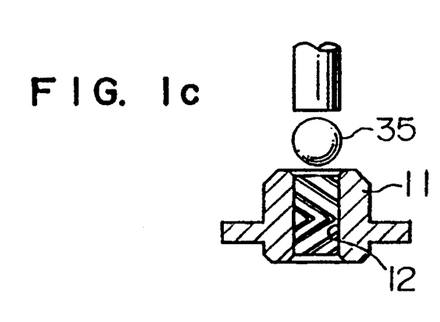
Figure 2A:
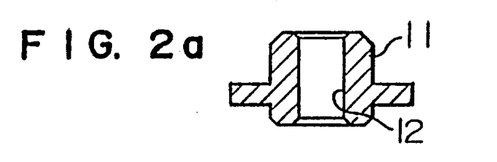
FIGS. 2a, 2b, 2c, 2d are views for explaining steps of a method of machining a sleeve bearing according to one embodiment of the present invention.
Figure 2B:
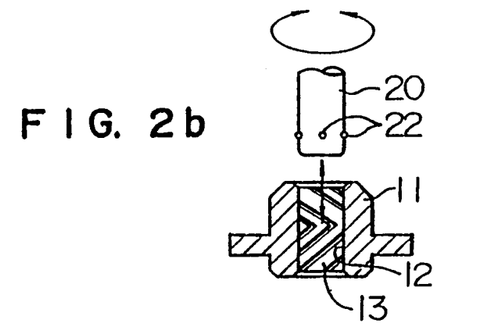
Figure 2C:
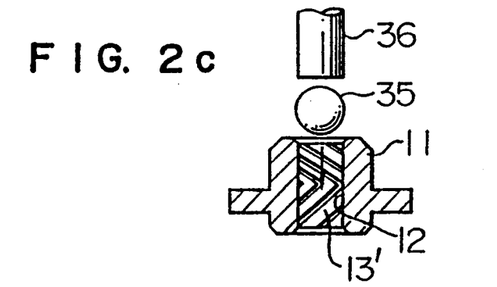
Figure 2D:
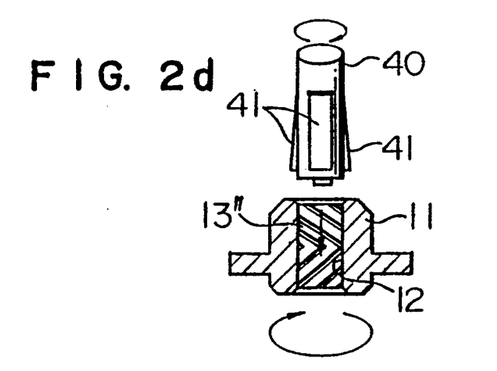
Figure 3A:
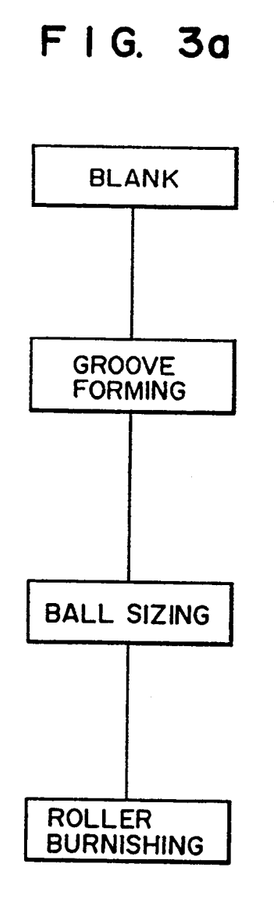
FIGS. 3a, 3b and 3c are block diagrams showing sleeve bearing machining steps of various kinds.
Figure 3B:
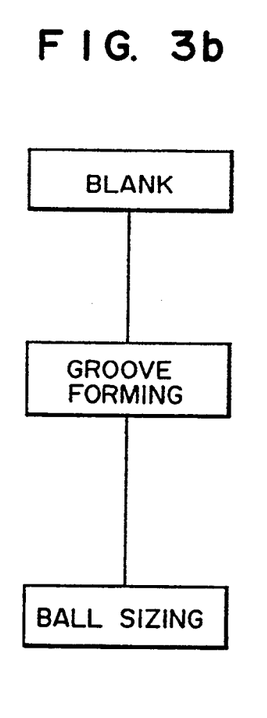

A conventional method of machining a sleeve bearing of this type comprises sleeve machining steps shown in FIG. 3b, wherein grooves 13 are formed, by a tool 20, on an inner peripheral surface 12 of a cylindrical blank 11 which has been subjected to lathe-turning machining, as shown in (a) of FIG. 1. A plurality of small-diameter steel balls 22 are securely fixed on an outer peripheral portion of the groove forming tool 20 in diametrically opposite relationship such that a distance 25 between opposite two of the small-diameter steel balls 22 has a value corresponding to a depth of the grooves formed on the inner peripheral surface 12 of the blank 11, as shown in (b) of FIG. 1. At the time of such groove forming, the small-diameter steel balls 22 of the groove forming tool 20 not only form the grooves 13 on the inner peripheral surface 12 but also raise portions of the blank 11 on both side edges of the grooves 13. A steel ball 35 having an outer diameter which is several μm to ten or more μm larger than a diameter of the finished inner peripheral surface is passed through the blank 11 so as to remove the raised deformations generated on the side edges of the grooves 13 on the inner peripheral surface 12 and to finish the inner peripheral surface ((c) of FIG. 1: ball sizing). At the same time, the roughness of the inner peripheral surface 12 of the blank 11 which has been subjected to lathe-turning machining is improved by plastic working when the steel ball 35 is passed. Another conventional technique concerning a spiral groove bearing wherein an insert member with a spiral groove formed on an inner peripheral surface thereof is used for an FDD apparatus is disclosed in Japanese Patent Unexamined Publication No 63-311620.

In the above-described conventional method of machining the sleeve bearing, however, the steel ball 35 is passed i.e. when (ball sizing is performed) for removal of raised deformations after the groove forming of the inner peripheral surface 12, and for finish machining. Consequently, in the case of the sleeve bearing which is thin, if it is to be finished at once by passing the steel ball 35 for both of these purposes, there is a problem that the shape accuracy of the bearing portion will be deteriorated. Although the surface roughness after ball sizing will be described in detail later, there is another problem that the roughness of the finished surface (FIG. 11b) will be only about half of that of the inner peripheral surface 12 of the blank 11 (FIG. 11a), to thereby affect the durability of the sleeve bearing.

Thus, the conventional sleeve bearing machining method having such problems can not realize a reduction in the size and weight of the rotary section by shortening and thinning the sleeve bearing.

SUMMARY OF THE INVENTION

It is therefore an object of the present invention to solve the problems of the conventional technique and to provide a method of machining a sleeve bearing by which the shape accuracy and the facial roughness of a shortened and thinned sleeve bearing can be improved.

According to the invention, in order to achieve the above-described object, grooves are formed on an inner peripheral surface of a cylindrically shaped blank by a groove forming tool having a tool shaft with a plurality of small-diameter steel balls securely fixed on an outer peripheral portion thereof, and when a steel ball is passed on the inner peripheral surface so as to remove raised deformations generated on the surface as a result of the groove forming, only the raised deformations are machined so as to maintain the shape accuracy. Then, a radial bearing portion of a dynamic pressure type of the sleeve bearing is finished by a finishing tool with a plurality of tapered rollers rotatably attached on a distal end portion thereof.

In this method, when the steel ball is passed on the inner peripheral surface so as to remove the raised deformations (i.e. when ball sizing is performed), only the raised deformations are machined so as to maintain the shape accuracy ( roundness ). After that, finish machining (i.e. roller burnishing) of the inner peripheral surface of the bearing is conducted by the finishing tool with the tapered rollers. In this case, the finishing tool is arranged to rotate freely while the blank which is a workpiece is rotated at a high speed. With such an arrangement, the plurality of tapered rollers are revolved about their own axes and rotated about the tool axis during the finish machining in response to the rotation of the workpiece, so that the bearing portion of the sleeve bearing can be finished to have a desired diameter and a favorable facial roughness.

DETAILED DESCRIPTION OF THE INVENTION

FIGS. 2a, 2b, 2c, 2d, are views for explaining a number of steps (a) to (d) of machining a sleeve bearing according to one embodiment of the present invention and an apparatus used for machining a workpiece to be processed in these machining steps, and FIG. 3a is a block diagram showing the machining steps of this embodiment.

FIG. 2 (a) illustrates a blank 11 whose cylindrical bore includes a bearing portion on an inner peripheral surface 12 thereof. FIG. 2 (b) shows a step of machining grooves 13. In this step, the grooves (dynamic pressure grooves) 13 are formed on the inner peripheral surface 12 of the blank 11 by means of a tool 20, with small-diameter steel balls 22 being fixed on an outer peripheral portion of the tool 20. In accordance with the number and sloping angles of the grooves 13, the groove forming tool 20 moves vertically while rotating clockwise and counterclockwise so as to form the grooves 13.

FIG. 2 (c) shows a step of ball sizing. In this step, a steel ball 35 is pressed by a pressure rod and passed through the cylindrical bore along the inner peripheral surface 12 on which the grooves 13 are formed. After the ball 35 has been passed, the grooves 13 having raised deformations at the edges are processed into grooves 13′ from which the raised deformations are removed.

FIG. 2 (d) shows a step of roller burnishing. In this step, the inner peripheral surface 12 is finished to have grooves 13″ by means of a finishing tool 40 including a plurality of tapered rollers 41. As a result of the finish machining, the inner peripheral surface 12 has a predetermined facial condition.

Figure 4:
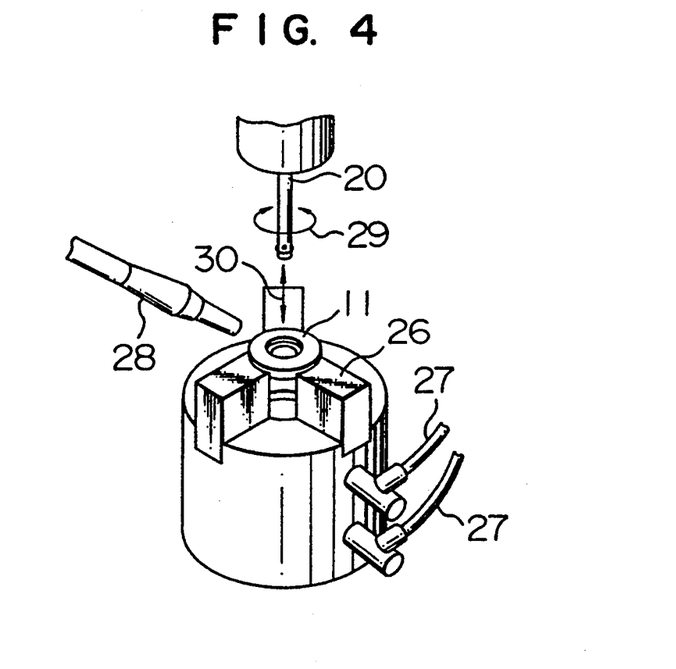
FIG. 4 is a structural view of an apparatus for groove forming.

FIG. 4 is a structural view of an apparatus for groove forming. A workpiece of a blank 11 is clamped by chuck claws 26. The chuck claws 26 function to clamp and release the workpiece 11 by use of the air supplied through air pipes 27. The groove forming tool 20, which is securely fixed on a main shaft of the groove forming apparatus, conducts normal/reverse rotations 29 and vertical movements 30. Further, the groove forming apparatus is provided with a nozzle 28 for supplying a lubricant to a machining portion during the operation.

Figure 5:
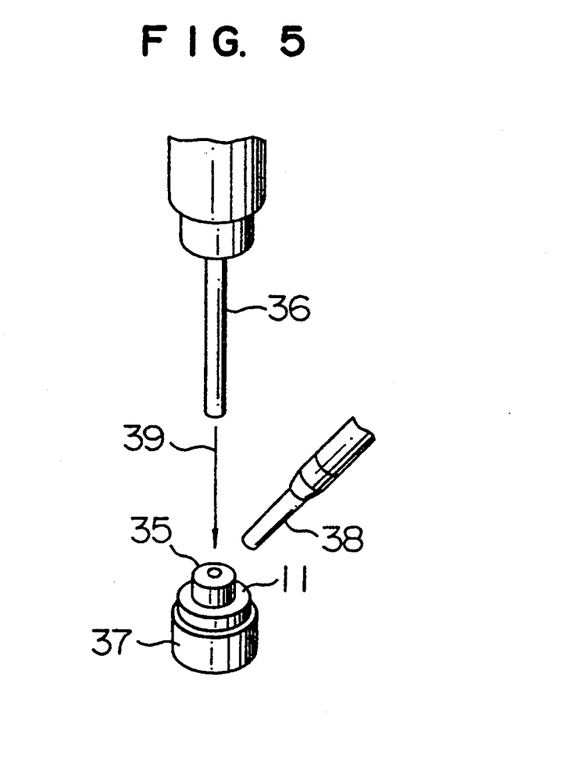
FIG. 5 is a structural view of an apparatus for ball sizing.

FIG. 5 is a structural view of an apparatus for ball sizing. The workpiece 11 is placed on a holder 37, and the ball 35 is mounted on the top of a cylindrical bore of the workpiece 11. The ball 35 is pressed in a direction 39 by the pressure rod 36 and passed through the cylindrical bore. The ball sizing apparatus is also provided with a nozzle 38 for supplying a lubricant to the ball 35.

Figure 6:
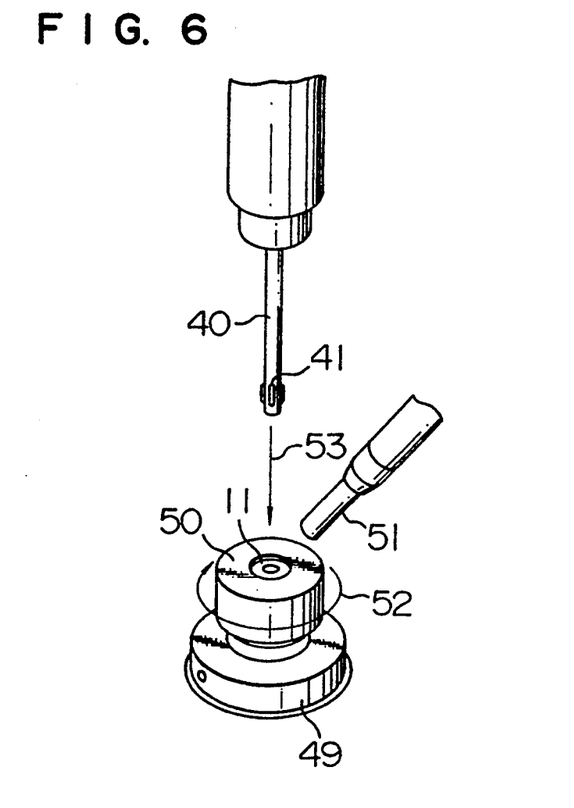
FIG. 6 is a structural view of an apparatus for roller burnishing.

FIG. 6 is a structural view of an apparatus for roller burnishing. The workpiece 11 is clamped on a spindle 49 by a clamper 50, and it rotates along with the spindle 49. The finishing tool 40, which is securely fixed on a main shaft of the roller burnishing apparatus, moves in a direction 53 toward the workpiece 11 when the workpiece 11 starts rotating in a direction 52, in order to perform the finish machining. Reference numeral 51 denotes an oil supply nozzle of the roller burnishing apparatus for supplying a lubricant to a machining portion.

Figure 7:
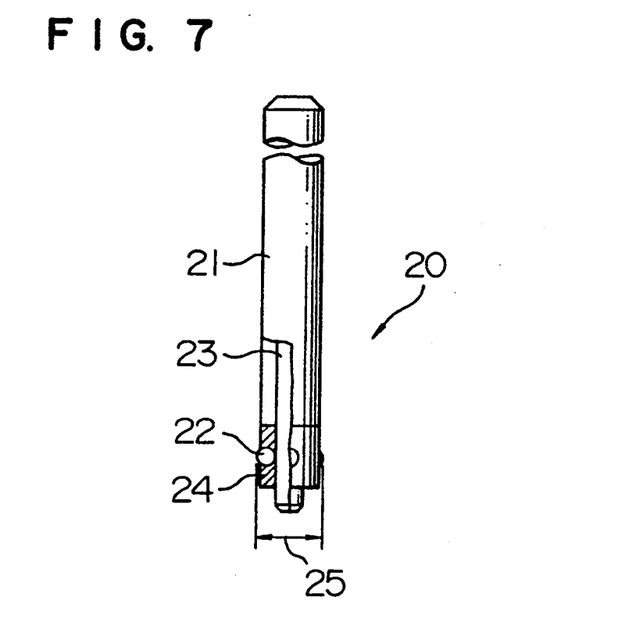
FIG. 7 is a partially cross-sectional view showing a groove forming tool in detail.

FIG. 7 is a partial cross-sectional view showing the structure of the groove forming tool 20 in detail. A small-diameter rod 23 is press-fitted in a tool shaft 21 from the distal end. The small-diameter steel balls 22 are, in pairs, press-fitted and sustained in a ring 24 in the vicinity of the rod 23, and at the same time, they are in contact with the rod 23. The distance 25 between each pair of the small-diameter steel balls 22 not only is restricted but also has a value corresponding to the depth of the grooves 13.

Figures 8, 9, 10:
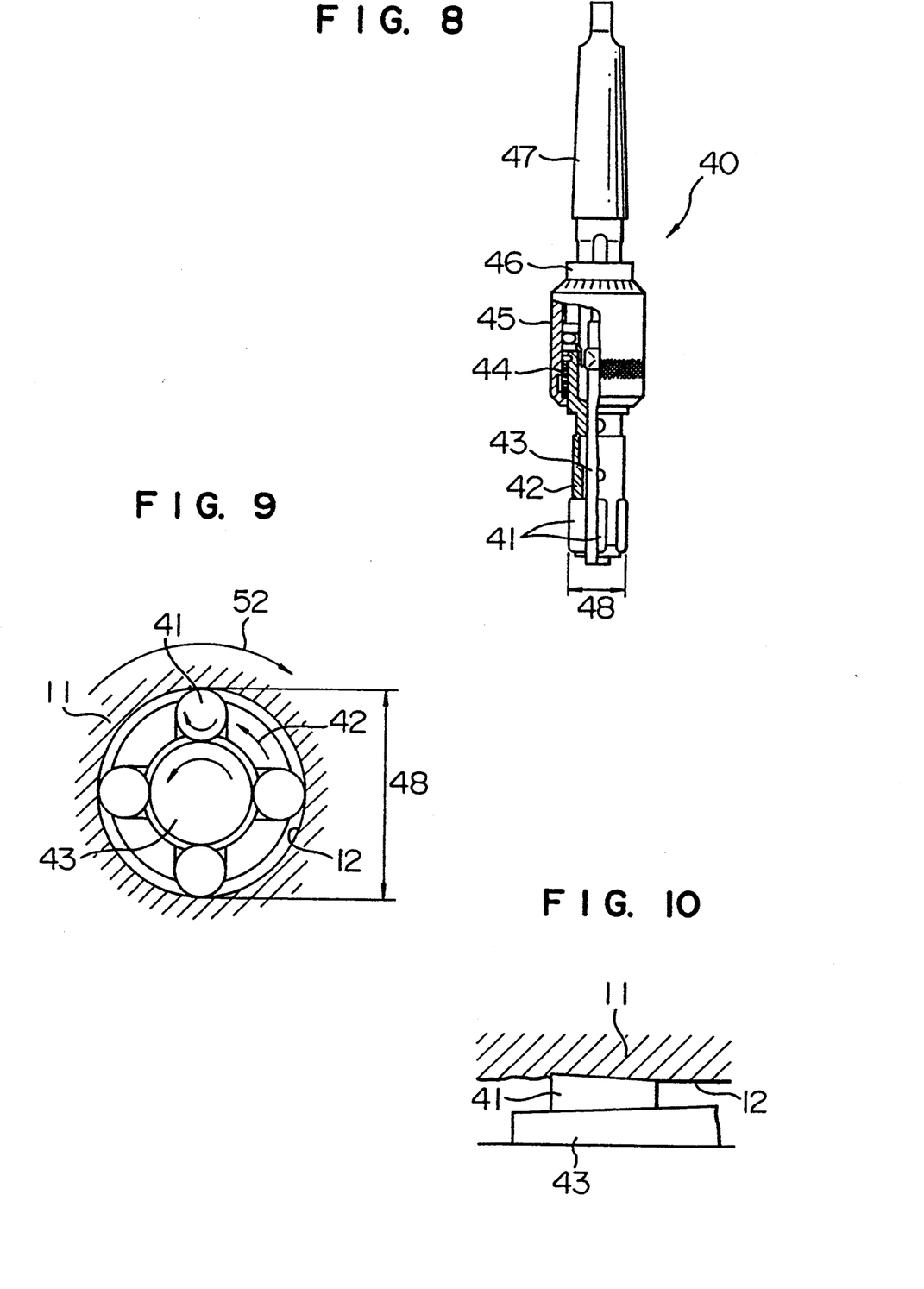
FIG. 8 is a partially cross-sectional view showing a roller burnishing tool in detail.
FIG. 9 is a cross-sectional view showing a condition of a distal-end machining portion of a finishing tool during machining.
FIG. 10 is an explanatory view showing a condition of an essential portion of the finishing tool during machining.

FIG. 8 is a partial cross-sectional view showing the structure of the finishing tool 40 in detail. A plurality of tapered rollers 41 are rotatably mounted at equal intervals on a frame 42 on a distal-end machining section of the finishing tool 40. A mandrel 43 tapered in a direction opposite to that of the tapered rollers 41 is extended in the center of the finishing tool 40 so as to determine the positions of the tapered rollers 41 and to restrict a tool diameter 48. Further, when a housing 45 of an adjusting ring 46 which is incorporated with a shank 47 is rotated to an extent in accordance with a machining size, the mandrel 43 moves vertically so that fine adjustment of the tool diameter 48 of the tapered rollers 41 can be carried out.

On the other hand, the frame 42 is carried on the housing 45 and pressed upwardly, as viewed in FIG. 8, by a plurality of springs 44 which are provided, at intervals, on the circumference between the frame 42 and the housing 45. When a lateral force exceeding forces of the springs 44 is exerted on the tapered rollers 41 during the finish machining, some of the springs 44 will be compressed and the frame 42 will be inclined slightly. With this function, the finishing tool 40 performs the alignment.

FIG. 9 is a cross-sectional view of the distal-end machining section of the finishing tool 40, showing a condition in which the tapered rollers 41 exert pressure on, and machine the inner peripheral surface 12 of the workpiece 11 whereas the tool diameter 48 thereof is restricted by the mandrel 43. In response to a rotation 52 of the workpiece 11, the tapered rollers 41 perform a planetary movement by revolving in the same direction around their own axes, but rotating in the opposite direction about the axis of the mandrel 43. This movement of the tapered rollers 41 serves to effect specular finish of the machined inner peripheral surface 12 uniformly.

FIG. 10 is an explanatory view showing a condition in which the finishing tool 40 is machining the workpiece 11. The tapered rollers 41 are larger in diameter toward the distal end of the tool so that the machined inner peripheral surface 12 can be worked to have a favorable facial roughness.

Moreover, the finishing tool 40 can be arranged in such a manner that when it is drawn from the workpiece 11 after the finish machining, the mandrel 43 is retracted to decrease the tool diameter 48, thus facilitating the tool drawing operation.

Figure 11A:
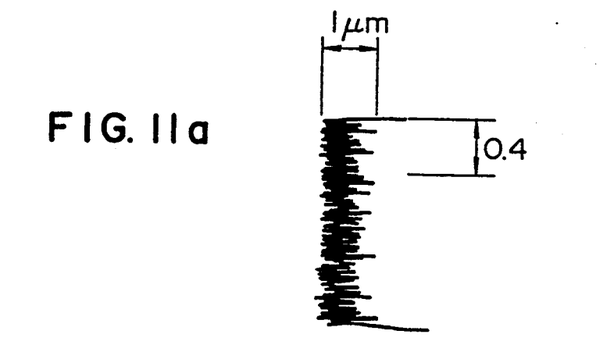
FIGS. 11a, 11b and 11c are explanatory views showing roughness of an inner peripheral surface of a bearing at the respective machining steps.
Figure 11B:
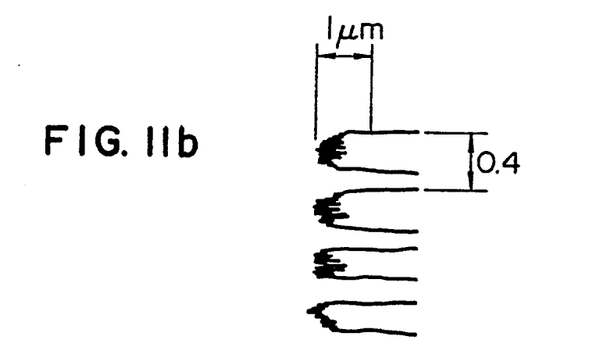
Figure 11C:
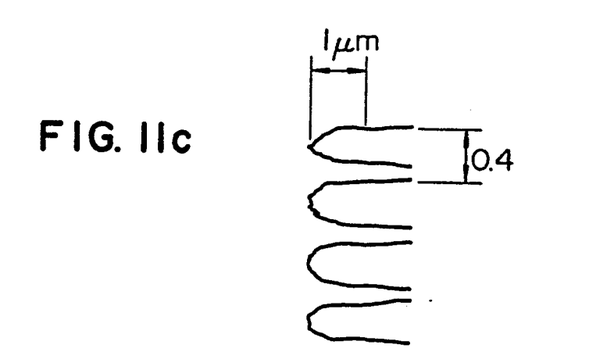

FIGS. 11a, 11b and 11c are explanatory views showing roughness of the inner peripheral surface 12 of the bearing portion at the respective machining steps which are measured by a roughness measuring device of a tracer method type. FIG. 11a shows a roughness of the inner peripheral surface 12 of the blank 11 which has been subjected to lathe-turning machining; FIG. 11b shows a roughness of the inner peripheral surface 12 after ball sizing; and FIG. 11c shows a roughness of the inner peripheral surface 12 after roller burnishing. The facial roughness is improved in the order of FIG. 11a→FIG. 11b→FIG. 11c.

Figure 12A:
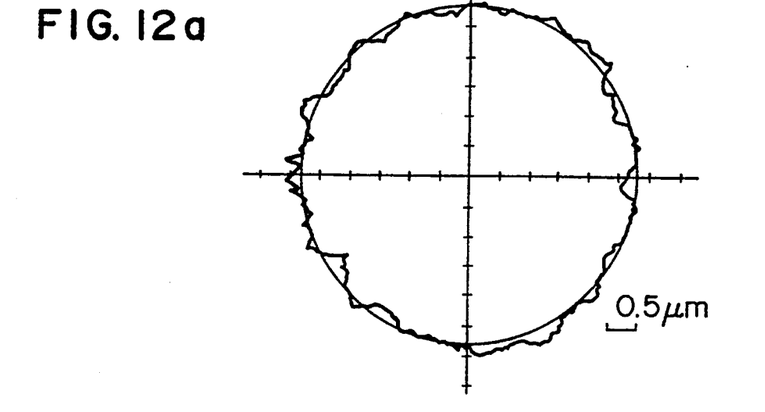
FIGS. 12a, 12b and 12c are explanatory views showing roundness of the inner peripheral surface of the bearing at the respective machining steps.
Figure 12B:
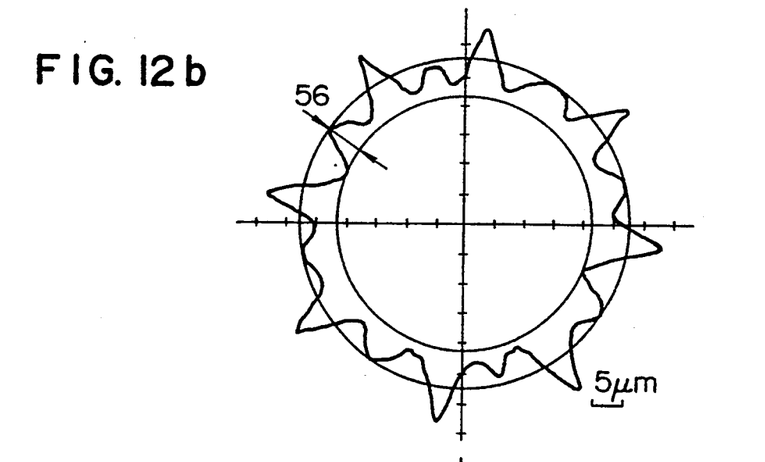
Figure 12C:
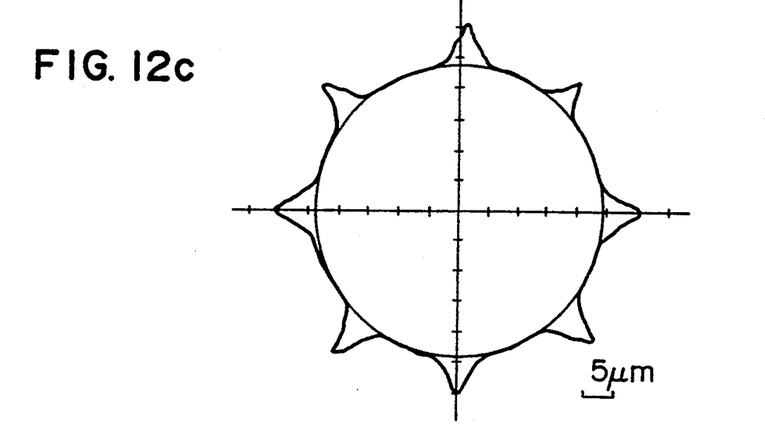

FIGS. 12a, 12b and 12c are explanatory views showing roundness of the inner peripheral surface 12 of the bearing portion at the respective machining steps which are measured by a roundness measuring device of a tracer method type. FIG. 12a shows a roundness of the cylindrical bore of the bearing section of the blank 11; FIG. 12b shows a roundness of the inner peripheral surface 12 after groove forming and raised deformations 56 of the inner peripheral surface 12 due to the groove forming; and FIG. 12c shows a roundness of the inner peripheral surface 12 after ball sizing, with the raised deformations 56 of the inner peripheral surface 12 being removed by the ball sizing.

Next, the operation of the above-described embodiment will be explained.

The blank 11 is made of a highly workable copper-base alloy which is suitable for a bearing, and it is a short thin cylinder having a bearing length of the sleeve bearing, the cylinder length being not more than three times larger than a shaft diameter. The thickness of the sleeve bearing is equal to or less than the shaft diameter. When grooves (dynamic pressure grooves) are formed on the inner peripheral surface 12 of such a blank by the groove forming tool 20, the number, sloping angle, width and depth of the grooves are determined by a designed bearing rigidity. In general, the number of grooves is six to twelve; the angle is 10° to 25°; the width is 0.1 mm to 0.3 mm; and the depth is several μm to ten or more μm.

Therefore, the diameter of the small-diameter steel balls 22 of the groove forming tool 20 is 0.8 to 1.5 mm, and the steel balls, which are half as many as the grooves are, securely fixed in pairs on the circumference of the shaft 23. The shaft 23 restricts the distance between each pair of the small-diameter steel balls 22 so that a value of the machining diameter 25 will be a value of the diameter of the cylindrical bore of the bearing section plus a value twice as large as the groove depth. The groove forming is performed under the conditions set in this manner. However, the raised deformations 56 on the inner peripheral surface 12 as a result of groove forming are about 1/5 to ½ of the groove depth, and the cylindrical bore is smaller in diameter (FIG. 12b).

Ball sizing is performed when the steel ball 35 having a diameter about several μm larger than that of the cylindrical bore of the blank 11 is passed through the cylindrical bore along the inner peripheral surface 12. The steel ball 35 is inserted into the cylindrical bore at a constant speed by means of the pressure rod 36 with hydraulic pressure. In consequence, the raised deformations 56 on the side edges of the grooves are removed to make the diameter of the bearing cylindrical bore substantially equal to the diameter of the cylindrical bore of the blank 11 at the early stage. Besides, with the above-mentioned machining amount, the roundness of the inner peripheral surface 12 of the bearing cylindrical bore of the thin sleeve bearing is not deteriorated so that the machining can be carried out while maintaining the roundness (FIG. 12c).

However, as shown in a block diagram of FIG. 3b showing the conventional machining steps, the diameter of the steel ball 35 to be passed through the bearing cylindrical bore must be made still about several μm larger than the above-mentioned diameter of the steel ball 35 in order to finish only with ball sizing, and therefore, the roundness of the bearing cylindrical bore will be deteriorated. Moreover, since the workpiece is not rotated in the ball sizing, specular finish can not be effected, and as obvious from the results of measurement by the roughness measuring device of the tracer method type shown in FIG. 11b, the roughness of the inner peripheral surface 12 of the bearing section is inadequate for maintaining a sufficiently long durability.

After removing the raised deformations 56 on the side edges of the grooves by the ball sizing, finish machining (roller burnishing) of the inner peripheral surface 12 is conducted by the finishing tool 40. Through the roller burnishing, specular finish of the inner peripheral surface 12 is effected (FIG. 11c) due to the structure of the finishing tool 40 described above and by the planetary movement of the tapered rollers 41, and also, the finish machining is performed with the tool diameter 48 being restricted to be about three to several μm larger than the finish diameter of the bearing cylindrical bore. Therefore, while maintaining the roundness of the bearing cylindrical bore, it is finished to have a diameter which is 2 to 3 μm larger than the diameter of the blank 11.

Figure 3C:
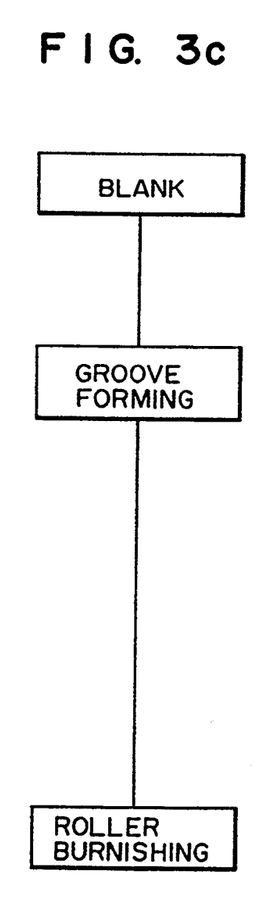

If the ball sizing step is omitted, as shown in a block diagram of machining steps of FIG. 3c, the raised deformations 56 as a result of groove forming will remain on the inner peripheral surface 12. Consequently, the finishing tool 40 is vibrated by the raised deformations 56, to thereby degrade the roundness. Thus, the bearing rigidity of the short cylindrical radial bearing of the dynamic pressure type is deteriorated so that the sleeve bearing which requires high accuracy can not be produced.

In the above-described embodiment, a combination of ball sizing and roller burnishing is employed to remove the raised deformations 56 caused by groove forming of the inner peripheral surface 12 of the bearing and to finish it to have a predetermined diameter of the bearing cylindrical bore, and an amount of each machining is set to obtain the most favorable facial roughness without deteriorating the shape accuracy of the inner peripheral surface such as the roundness. Ball sizing while maintaining the roundness and roller burnishing with a specular finish effect are combined effectively to work a short and thin sleeve bearing highly accurately, thereby enabling the size and weight reduction of rotary sections of apparatus.

According to the present invention, as described heretofore, the finish machining after groove forming is a combination of ball sizing for removing raised deformations of the inner peripheral surface on which grooves are formed and roller burnishing for specular finish of the inner peripheral surface while finishing the bearing cylindrical bore to have a predetermined diameter. With this combination, specular finish of the inner peripheral surface of the bearing can be managed without deteriorating the shape accuracy such as the roundness. Moreover, with the finish machining of this combination, a short and thin sleeve bearing can be worked highly accurately, and thus, there can be provided a sleeve bearing machining method which enables the size and weight reduction of rotary sections of apparatus.

What is claimed is:

1. A method of machining a sleeve bearing comprising:
    rotating a groove forming tool having a plurality of small-diameter balls securely fixed to a tool shaft along an inner peripheral surface of a cylindrical blank having an initial diameter so as to form grooves on said inner peripheral surface;
    passing a ball along said inner peripheral surface so as to remove only raised deformations present on said surface as a result of forming said grooves, said ball having a selected diameter so as to make the diameter of said cylindrical blank substantially equal to said initial diameter;

finishing said inner peripheral surface by rotating a finishing tool with respect to said inner surface, said finishing tool being provided with means for aligning said finishing tool with an axis of said inner peripheral surface and said finishing tool being provided at a distal end portion thereof with a plurality of rotatable tapered rollers.

2. A method of machining a sleeve bearing according to claim 1, wherein said finishing tool machines the inner peripheral surface of the cylindrical blank by applying said tapered rollers on the surface and exerting a pressure on the surface while restricting a tool diameter by a mandrel.

3. A method of machining a sleeve bearing according to claim 1, wherein said finishing tool is aligned with the axis of said inner surface by arranging a frame rotatably supporting said tapered rollers to be tiltable with respect to a housing of said finishing tool.

4. A method of machining a sleeve bearing comprising:

forming grooves on an inner peripheral surface of a cylindrical blank having an initial diameter;

ball sizing said inner peripheral surface by passing a steel ball along said surface, thereby removing only raised deformations generated on the surface during the groove forming, said ball having a selected diameter so as to make the diameter of said cylindrical blank substantially equal to said initial diameter; and finishing said inner peripheral surface by rotating said cylindrical blank with respect to a finishing tool at high speed, said finishing tool being provided with a plurality of freely rotatable tapered rollers and means for aligning said finishing tool with an axis of said inner surface.

5. A method of machining a sleeve bearing according to claim 4, wherein said finishign tool machines the inner peripheral surface of the cylindrical blank by applying said tapered rollers on the surface and exerting a pressure on the surface while restricting a tool diameter by a mandrel.

6. A method of machining a sleeve bearing according to claim 4, wherein said finishing tool is aligned with the axis of said inner surface by arranging a frame rotatably supporting said tapered rollers to be tiltable with respect to a housing of said finishing tool.

* * * * *